United States Patent [19]

Scherubel

[11] 4,140,640

[45] Feb. 20, 1979

[54] SELF-BREAKING RETARDED ACID EMULSION

[75] Inventor: Gary A. Scherubel, Tulsa, Okla.

[73] Assignee: The Dow Chemical Company, Midland, Mich.

[21] Appl. No.: 813,367

[22] Filed: Jul. 6, 1977

[51] Int. Cl.$^2$ .............................................. E21B 43/27
[52] U.S. Cl. ................................ 252/8.55 C; 166/307; 252/8.55 R
[58] Field of Search ...................... 252/8.55 C, 8.55 R; 166/307

[56] References Cited

U.S. PATENT DOCUMENTS

| 2,050,932 | 8/1936 | De Groote | 252/8.55 |
| 2,802,531 | 8/1957 | Cardwell et al. | 253/8.55 X |
| 3,044,549 | 7/1962 | Jones | 166/307 |
| 3,319,714 | 5/1967 | Knox | 166/307 |
| 3,353,603 | 11/1967 | Knight | 166/307 |
| 3,962,101 | 6/1976 | Crowe | 252/8.55 |
| 3,962,102 | 6/1976 | Crowe | 252/8.55 |

*Primary Examiner*—Herbert B. Guynn
*Attorney, Agent, or Firm*—G. H. Korfhage

[57] ABSTRACT

A subterranean formation is acidized with an emulsion comprising an aqueous acidizing solution, an oil, an effective amount each of an alkyl $C_8$ to $C_{18}$ primary fatty amine and at least one diethanolamide of at least one $C_8$ to $C_{18}$ fatty acid.

41 Claims, No Drawings

SELF-BREAKING RETARDED ACID EMULSION

I. BACKGROUND OF THE INVENTION

A. Field of the Invention

The invention relates to retarded acid-in-oil emulsions and to methods of treating an acid soluble subterranean formation with such an emulsion.

B. Description of the Prior Art

Calcareous formations such as limestone, dolomite or other calcareous-magnesium formations which are at least partially soluble in acid are often treated with an acid to increase the permeability thereof. Such treatments are particularly valuable in stimulating wells to enhance the recovery of valuable formation fluids such as petroleum or gas.

One difficulty in the past which has been experienced in this field is the rapid, spontaneous action of the acid on the formation. The rate at which the acid reacts with the formation is a function of various factors including acid concentration, temperature, fluid viscosity, the particular type of calcareous material, and the surface area to acid volume ratio. In acid treatments of wells the acid can be pumped only a certain distance into the formation before the acid becomes spent. The time required for the acid to become spent is generally referred to as the reaction time. To more efficiently treat certain formations it is desirous to increase the reaction time of the acid. This is true for instance when the acid solution is to be employed to also fracture the formation.

Basically three approaches have been taken to extend the reaction time of acidizing compositions.

One approach is to employ an acid-in-oil emulsion. An early emulsion patent is de Groote, U.S. Pat. No. 1,922,154. de Groote, however, appears to have been more concerned about protecting the casing in the wellbore from corrosion rather than in retarding the action of the acid on the formation itself. Cardwell et al., U.S. Pat. No. 2,802,531 employed an emulsion to keep a proppant suspended in a fracturing method, but does teach the aqueous phase could be an acid. Cardwell et al. mention as suitable emulsifiers, long chain amides (col. 3, line 28) —but not ethanol amides, and hydrochlorides of long chain amines (col. 3, line 45). Jones, U.S. Pat. No. 3,044,549, employed acid and oil as a mixture, but apparently not as an emulsion (see col. 2, line 49 and column 5, line 19). Knight, U.S. Pat. No. 3,353,603 employed an emulsion using an alcohol sulfate or dodecylbenzenesulfonic acid as a surfactant/retarder. Fast et al., U.S. Pat. No. 3,681,240 is similar to Knight, except that Fast et al. employed an amine salt of dodecylbenzenesulfonic acid rather than the free acid. Crowe, U.S. Pat. No. 3,779,916 employed an acid-in-oil emulsion containing a saturated hydrocarbon sulfonate and an alkylarylsulfonic acid or water soluble salt thereof. Crowe, U.S. Pat. No. 3,917,535 obtained increased penetration of the acid into the formation by controlling the fluid loss using an oil-in-acid emulsion. Crowe, U.S. Pat. No. 3,962,102 employs a retarded emulsion containing a $C_8$ to $C_{18}$ primary amine.

A second approach to retarding the action of the acid is to pretreat the formation with a composition which renders the formation oil wet. Art representative of this technique includes Knox et al., U.S. Pat. No. 3,343,602 and Bombardieri, U.S. Pat. No. 3,434,545. Somewhat related are Thompson et al., U.S. Pat. No. 2,908,643, which discloses treating limestone with a $C_{8-12}$ aliphatic amine to render the limestone preferentially oil wet, and Blair, Jr., U.S. Pat. No. 2,331,594 which teaches a similar treatment for silica, but the patents do not apply their methods in the context of acidizing.

The third technique referred to involves including a retarding surfactant directly in the acid, which acid remains substantially non-emulsified. Knox, U.S. Pat. No. 3,319,714, for example, employs an anionic surfactant in the acid. Crowe, in U.S. Pat. Nos. 3,917,536 and 3,962,101 teaches use of a $C_{8-18}$ primary amine and, optionally, a quaternary amine. Reed, U.S. Pat. No. 2,370,421 teaches an acidizing composition containing a mixture of sulfonic acids, but appears to be directed more toward altering the surface tension of the acid rather than retarding the acid.

Of the foregoing, the retarded acid emulsions of Crowe, U.S. Pat. Nos. 3,779,916 and 3,962,102 are believed most pertinent. The emulsion of U.S. Pat. No. 3,779,916 has proved quite successful commercially, particularly when used with moderately concentrated acid, e.g., about 15% HCl and less. The degree of retardation obtained with the emulsion of U.S. Pat. No. 3,779,916 using concentrated acid, e.g., above 25% HCl, at high temperatures, e.g., above 150° F, however, is somewhat less than desirable for widespread commercial application. The emulsion of U.S. Pat. No. 3,962,101 offers greater retardation, particularly with highly concentrated acid at elevated temperatures than does the emulsion of U.S. Pat. No. 3,779,916, but has as a drawback the fact that the emulsion does not always break upon substantial spending of the acid thereby making well clean-up somewhat difficult.

II. SUMMARY OF THE INVENTION

The present invention is an improved acid-in-oil acidizing emulsion, and acidizing method using such an emulsion, said emulsion being of the type containing an effective amount of at least one $C_8$ to $C_{18}$ primary amine as a cationic surfactant to increase the normal reaction time of the acid with an acid soluble formation. The improvement in both the composition and method aspects of the present invention is the inclusion in the emulsion of an effective amount of a nonionic surfactant comprising at least one diethanolamide of at least one $C_8$ to $C_{18}$ fatty acid, to cause the emulsion to break as the acidizing capacity of the emulsion becomes substantially depleted, i.e., spent, on the formation.

III. FURTHER DESCRIPTION OF THE INVENTION

Cationic surfactants which can be employed in the practice of the present invention include $C_8$ to $C_{18}$ (inclusive) primary fatty amines or mixtures thereof, corresponding to the formula $RNH_2$ wherein the R group comprises a $C_8$ to $C_{18}$ alkyl group. Specific surfactants which can be employed include, for example, cocoamine, dodecylamine, tetradecylamine, decylamine, octylamine, and mixtures thereof. Preferably, the surfactant consists primarily of dodecylamine. In this respect, cocoamine, which contains a large portion of dodecylamine, is an example of a surfactant containing more than one fatty amine. The amine can be employed as such or various salts which are soluble in the particular system employed can be utilized. Useful salts include, for example, acetates, chlorides, sulfates, phosphates, nitrates and the like.

The reaction time of any acidizing emulsion used to acidize calcareous formations, e.g., limestone, dolomite, and other formations, can be increased by incorporating into the emulsion a sufficient quantity of the above-identified surfactant. There appears to be no critical quantity and the amount employed will depend on such factors as desired increase in reaction time, economic considerations and the like. Suitable results can be obtained when as little as about 0.01, preferably about 0.05 percent by weight of the surfactant is employed. Economic considerations generally dictate a maximum amount of about 10 percent by weight of surfactant in the acidizing emulsion, preferably about 0.5 percent.

The nonionic surfactant employed in the present invention is a diethanolamide of a $C_8$ to $C_{18}$ fatty acid. Specific amides which may be employed include the diethanolamides of any one of or a mixture of any two or more of acids such as octanoic, pelargonic, capric, undecylic, lauric, tridecylic, myristic, pentadecylic, palmitic, margaric, and stearic. Unsaturated fatty acid diethanolamides are also suitable, such as the diethanolamides of such acids as obtusilic, caproleic, 10-undecylenic, lauroleic, physeteric, myristoleic, palmitoleic, petroselinic, petroselaidic, oleic, elaidic, vaccenic, and linoleic. Preferably, the amide is derived from a $C_{18}$ acid, most preferably oleic.

An amount of the amide is employed which is effective to cause the emulsion to break at about the time the acid is substantially completely spent, e.g., within about a half an hour. In this respect, some of the art relating to acidizing emulsions speaks of certain emulsions breaking upon contact with the formation, or that certain emulsions must break before the acid reacts with the formation. However, qualitative tests on limestone coupons both with emulsions using the amine alone (i.e., as in U.S. Pat. No. 3,962,102) and with emulsions using the amine plus the amide (according to the present invention) give a substantial period of effervescence without the emulsion breaking significantly, thereby indicating a complete break is not required for the acid to react with the formation. With emulsions according to the present invention, the emulsion visibly breaks at approximately the same time that effervescence ceases—indicating the acid is substantially spent. Without the amide, emulsions of U.S. Pat. No. 3,962,102 tend to remain emulsified long after effervescence ceases. The amount by weight of amide employed according to the present invention depends upon the amount of the primary amine employed, and generally is from about 0.85 to 2 times the weight of the amine. Preferably, about 1 to about 1.6 parts by weight of the diethanol amide is employed per part of primary amine.

Acidizing acids which can be employed include: HCl, HF, formic acid, acetic acid, sulfamic acid, various mixtures thereof and other acids which are compatible with the specific surfactants employed. The acid solutions can contain up to about 40 percent by weight or more of the acid. The surfactants of the present invention are particularly useful in acidizing emulsions wherein the aqueous phase contains an acidizing acid, e.g., HCl, in a concentration of more than about 15 percent by weight of the aqueous phase, especially where the concentration of the acid is greater than 25 percent, e.g., about 28% HCl, and the temperature of the formation to be acidized is about 150°–250° F.

Any liquid hydrocarbon generally employed in the art to prepare acid-in-oil emulsions can be employed. Liquids which can be employed include, for example, crude oil, various grades of diesel oil, fuel oil, kerosene, gasoline, aromatic oils, petroleum fractions, mineral oils and various mixtures thereof. Kerosene is preferred because corrosion rates using kerosene are generally somewhat less than with certain other hydrocarbons.

The liquid hydrocarbon phase can comprise, as percent by volume, from about 5 to about 95, preferably from about 10 to about 50 percent of the emulsion, and most preferably, about 25–35 percent.

The method and composition of the present invention is practiced using standard acidizing equipment and procedures well-known in the art. The composition and method can be employed in matrix and fracturing acidizing techniques. Further, the composition may contain other constituents, e.g., clay stabilizers, scale inhibitors, and corrosion inhibitors well-known in the art. However, where other components are included, laboratory tests to verify the compatibility of the various components should be carried out prior to carrying out a large scale operation. For example, though inhibitors are not required inhibitors based on acetylenic alcohols or acetylenic alcohols plus a pyridinium compound have been found suitable, whereas certain inhibitors of the Mannich reaction product type adversely affected the stability of the unspent emulsion, although other Mannich reaction product type inhibitors have been successfully employed.

IV. EXAMPLES AND COMPARISON TESTS

Except as otherwise noted, all tests were carried out on approximately 70 volume percent acid solution:30 volume percent kerosene emulsions. All references to a percent HCl refer to the weight percent concentration of HCl in the aqueous phase.

SERIES I

Four compositions were prepared based on 28% HCl. One was simply 28 percent HCl. Another employed the emulsion system of U.S. Pat. No. 3,779,916 with 28% HCl and contained 1 volume percent of a solution containing about 70 weight percent a saturated hydrocarbon sulfonate and about 25 weight percent dodecylbenzene sulfonic acid in isopropyl alcohol, so that the emulsion itself contained about 0.7 weight percent saturated hydrocarbon sulfonate and 0.25 weight percent alkylaryl sulfonate. A third composition was an emulsion according to the present invention containing 1 volume percent of a mixture containing, by volume, 25% Armeen C brand cocoamine (90 weight percent active), 25% Witcamide 511 brand diethanolamide of oleic acid, and as a diluent, 6% glacial acetic acid and 44 percent isopropyl alcohol, which resulted in an emulsion containing, by weight, about 0.17 percent cocoamine and about 0.23 percent of the diethanolamide of the fatty acid, i.e., about 1.33 parts amide per part of amine. The fourth composition was substantially the same as the third, except that it contained dodecylamine in lieu of cocoamine. All four compositions contained an equal amount by volume of Coronox 265 brand corrosion inhibitor (active ingredients, a pyridinium compound and acetylenic alcohol).

Limestone coupons which had been soaked in kerosene were exposed to each of the compositions for 30 minutes in a static bomb test conducted at ambient room temperature under 1000 psi pressure. Reaction rates were calculated based on the weight loss from the limestone coupon per unit of initial surface area of the coupon. The results, which are shown in Table I, demonstrate that the present emulsion more effectively retards concentrated acid than does the emulsion of U.S. Pat.

No. 3,779,916, and at a much lower concentration of active surfactants.

third composition in Series I. Where just an amine is present, the emulsifier was Armeen C brand cocoamine (90% active) and where just the diethanolamide is present, the emulsifier was Witcamide 511 brand diethanolamide of oleic acid (reported by the manufacturer to be 100% active).

The "% Active" columns are approximate weight percent active ingredients, calculated from the specific gravities of the various components without correction for temperature.

The "Corrosion" column reports the weight loss per unit area over the duration of the test.

TABLE I

Reaction Rates of Various 28% HCl Compositions

| | % Amine | % Amide | % alkyl sulfonate | % alklaryl sulfonate | Rate lbs/ft$^2$/sec × 10$^4$ |
|---|---|---|---|---|---|
| Straight Acid | — | — | — | — | 10.42 |
| 3,779,916 emulsion | — | — | 0.25 | 0.7 | 8.55 |
| This invention with cocoamine | 0.17 | 0.23 | — | — | 0.18 |
| This invention with dodecyl amine | 0.17 | 0.23 | — | — | 0.19 |

SERIES II

Table II shows the results of static corrosion tests on N80 steel coupons. Tests at temperatures of 200° F and above were run under 1000 psi; those at lower temperatures were run at autogenous pressure in a closed container.

In the table, "% Emulsifier" is the volume percent of emulsifier formulation employed in the emulsion. The emulsifier formulation employed where both the amine and the amide were present was that employed for the

TABLE II

Corrosion Data

| Volume % Emulsifier Formulation | Approx. % Active Amine | Approx. % Active Amide | Volume % Inhibitor (Coronox 265) | Test Duration, Hours | Temperature °F | % HCl | Corrosion lb/ft$^2$ | Remarks |
|---|---|---|---|---|---|---|---|---|
| 1.0 | 0.17 | 0.23 | 2.0 | — | — | 32 | — | Emulsion did not form - too much inhibitor |
| 1.0 | 0.17 | 0.23 | 1.5 | — | — | 32 | — | |
| 1.0 | 0.17 | 0.23 | 1.0 | — | — | 32 | — | |
| 1.0 | 0.17 | 0.23 | 0.75 | 6 | 200 | 32 | 0.035 | |
| 1.0 | 0.17 | 0.23 | 0.75 | 6 | 175 | 32 | 0.019 | |
| 1.0 | 0.17 | 0.23 | 0.5 | 6 | 175 | 32 | 0.023 | |
| 0.75 | 0.13 | 0.17 | 0.5 | 6 | 150 | 32 | 0.011 | |
| 0.75 | 0.13 | 0.17 | 0.25 | 6 | 150 | 32 | 0.011 | |
| 1.5 | 0.26 | 0.35 | 1.0 | 2 | 250 | 28 | 0.042 | Average of 3 runs |
| 1.0 | 0.17 | 0.23 | 1.0 | 2 | 250 | 28 | 0.039 | Average of 2; unusual run of 0.131 excluded |
| 1.0 | 0.17 | 0.23 | 0.75 | 2 | 250 | 28 | 0.031 | Average of 3 runs |
| 1.0 | 0.17 | 0.23 | 0.75 | 6 | 200 | 28 | 0.020 | Average of 4 runs |
| 1.0 | 0.17 | 0.23 | 0.5 | 6 | 200 | 28 | 0.063 | |
| 1.0 | 0.17 | 0.23 | None | 4 | 200 | 28 | 0.009 | Average of 2 runs |
| 1.0 | 0.17 | 0.23 | None | 4 | 200 | 28 | 0.020 | |
| 1.0 | 0.17 | 0.23 | None | 4 | 200 | 28 | 0.021 | |
| 1.0 | 0.17 | None | 2.0 | 4 | 200 | 28 | 0.014 | |
| 1.0 | None | 0.91 | 2.0 | 4 | 200 | 28 | 0.012 | Emulsion partially broken |
| 1.0 | 0.69 | None | 1.0 | 4 | 200 | 28 | 0.021 | |
| 1.0 | None | 0.91 | 1.0 | 4 | 200 | 28 | 0.370 | Emulsion completely broken |
| 1.0 | 0.69 | None | 0.5 | 4 | 200 | 28 | 0.044 | |
| 1.0 | None | 0.91 | 0.5 | 4 | 200 | 28 | 0.404 | Emulsion completely broken |
| 1.0 | 0.69 | None | 0.25 | 4 | 200 | 28 | 0.062 | |
| 1.0 | None | 0.91 | 0.25 | 4 | 200 | 28 | 0.726 | Emulsion completely broken |
| 0.5 | 0.35 | None | 2.0 | 4 | 200 | 28 | 0.025 | |
| 0.5 | None | 0.46 | 2.0 | 4 | 200 | 28 | 0.023 | Emulsion partially broken |
| 0.5 | 0.35 | None | 1.0 | 4 | 200 | 28 | 0.016 | |
| 0.5 | None | 0.46 | 1.0 | 4 | 200 | 28 | 0.029 | Emulsion completely broken |
| 0.5 | 0.35 | None | 1.0 | 4 | 200 | 28 | 0.020 | Ave.2;Oil 99:1 Kerosene:Diesel |
| 0.5 | 0.35 | None | 1.0 | 4 | 200 | 28 | 0.038 | Ave.2;Oil 95:5 Kerosene:Diesel |
| 0.5 | 0.35 | None | 1.0 | 4 | 200 | 28 | 0.057 | Ave.2;Oil 90:10 Kerosene:Diesel |
| 0.5 | 0.35 | None | 1.0 | 4 | 200 | 28 | 0.088 | Ave.2;Oil 75:25 Kerosene:Diesel |
| 0.5 | 0.34 | None | 1.0 | 4 | 200 | 28 | 0.208 | Ave.2;Oil 50:50 Kerosene:Diesel |
| 0.5 | 0.35 | None | 0.5 | 4 | 200 | 28 | 0.035 | |
| 0.5 | None | 0.46 | 0.5 | 4 | 200 | 28 | 0.118 | Emulsion completely broken |
| 0.5 | 0.35 | None | 0.25 | 4 | 200 | 28 | 0.073 | |
| 0.5 | None | 0.46 | 0.25 | 4 | 200 | 28 | 0.620 | Emulsion completely broken |
| 0.25 | 0.17 | None | 2.0 | 4 | 200 | 28 | 0.080 | |
| 0.25 | None | 0.23 | 2.0 | 4 | 200 | 28 | 0.020 | Emulsion partially broken |
| 0.25 | 0.17 | None | 1.0 | 4 | 200 | 28 | 0.073 | |
| 0.25 | None | 0.23 | 1.0 | 4 | 200 | 28 | 0.055 | Emulsion completely broken |
| 0.25 | 0.17 | None | 0.5 | 4 | 200 | 28 | 0.024 | |
| 0.25 | None | 0.23 | 0.5 | 4 | 200 | 28 | 0.498 | Emulsion completely broken |
| 0.25 | 0.17 | None | 0.25 | 4 | 200 | 28 | 0.057 | |
| 0.25 | None | 0.23 | 0.25 | 4 | 200 | 28 | 0.808 | Emulsion completely broken |
| 1.0 | 0.17 | 0.23 | 0.75 | 6 | 175 | 28 | 0.031 | Average of 2 |
| 1.0 | 0.17 | 0.23 | 0.5 | 6 | 175 | 28 | 0.132 | |
| 1.0 | 0.17 | 0.23 | 0.25 | 6 | 175 | 28 | 0.242 | |
| 1.0 | 0.17 | 0.23 | 0.5 | 6 | 150 | 28 | 0.015 | |
| 1.0 | 0.17 | 0.23 | 0.25 | 6 | 150 | 28 | 0.023 | |
| 0.75 | 0.13 | 0.17 | 0.5 | 6 | 150 | 28 | 0.015 | |
| 0.75 | 0.13 | 0.17 | 0.25 | 6 | 150 | 28 | 0.015 | |
| 1.0 | 0.17 | 0.23 | None | 4 | 150 | 28 | 0.007 | |

TABLE II-continued

| Volume % Emulsifier Formulation | Approx. % Active Amine | Approx. % Active Amide | Volume % Inhibitor (Coronox 265) | Test Duration, Hours | Temperature °F | % HCl | Corrosion lb/ft$^2$ | Remarks |
|---|---|---|---|---|---|---|---|---|
| 0.5 | 0.09 | 0.11 | None | 4 | 150 | 28 | 0.008 | |
| 0.75 | 0.13 | 0.17 | 0.5 | 6 | 125 | 28 | 0.004 | |
| 0.75 | 0.13 | 0.17 | 0.25 | 6 | 125 | 28 | 0.010 | |
| 0.5 | 0.09 | 0.11 | 0.25 | 6 | 125 | 28 | 0.009 | |
| 0.5 | 0.09 | 0.11 | 0.125 | 6 | 125 | 28 | 0.012 | |
| 0.25 | 0.04 | 0.06 | 0.125 | 6 | 125 | 28 | 0.013 | |
| 1.0 | 0.17 | 0.23 | 0.5 | 6 | 100 | 28 | 0.005 | |
| 1.0 | 0.17 | 0.23 | 0.25 | 6 | 100 | 28 | 0.006 | |
| 1.0 | 0.17 | 0.23 | 0.125 | 6 | 100 | 28 | 0.009 | |
| 1.0 | 0.18 | 0.24 | 0.75 | 6 | 200 | 20 | 0.030 | |
| 0.75 | 0.13 | 0.18 | 0.5 | 6 | 200 | 20 | 0.078 | |
| 1.0 | 0.18 | 0.24 | None | 4 | 200 | 20 | 0.028 | |
| 0.75 | 0.13 | 0.18 | None | 4 | 200 | 20 | 0.027 | |
| 0.5 | 0.09 | 0.12 | None | 4 | 200 | 20 | 0.068 | |
| 0.75 | 0.13 | 0.18 | 0.5 | 6 | 175 | 20 | 0.020 | |
| 0.75 | 0.13 | 0.18 | 0.5 | 6 | 150 | 20 | 0.007 | |
| 0.5 | 0.09 | 0.12 | 0.25 | 6 | 150 | 20 | 0.010 | |
| 0.75 | 0.14 | 0.18 | 0.5 | 6 | 200 | 15 | 0.020 | |
| 0.5 | 0.09 | 0.12 | 0.25 | 6 | 200 | 15 | 0.057 | |
| 1.0 | 0.18 | 0.24 | None | 4 | 200 | 15 | 0.012 | |
| 0.75 | 0.14 | 0.18 | None | 4 | 200 | 15 | 0.013 | |
| 0.5 | 0.09 | 0.12 | None | 4 | 200 | 15 | 0.014 | |
| 0.75 | 0.14 | 0.18 | 0.5 | 6 | 175 | 15 | 0.006 | |
| 0.5 | 0.09 | 0.12 | 0.25 | 6 | 175 | 15 | 0.013 | |
| 0.5 | 0.09 | 0.12 | 0.25 | 6 | 150 | 15 | 0.006 | |
| 0.25 | 0.05 | 0.06 | 0.125 | 6 | 150 | 15 | 0.007 | |
| 1.0 | 0.18 | 0.24 | None | 4 | 150 | 15 | 0.009 | |
| 0.5 | 0.09 | 0.12 | None | 4 | 150 | 15 | 0.011 | |

What is claimed is:

1. In a method of acidizing an acid-soluble subterranean formation by contacting said formation with a retarded aqueous acid solution-in-oil emulsion, said emulsion including an effective retarding amount of at least one alkyl $C_8$ to $C_{18}$ primary amine, the improvement which comprises: including in said emulsion, an effective amount of at least one diethanolamide of at least one $C_8$ to $C_{18}$ fatty acid so that said emulsion breaks upon the substantial depletion of the acidizing capacity of the emulsion after contact with the formation.

2. The method of claim 1 wherein the amine is dodecylamine or cocoamine and the amide is the diethanolamide of oleic acid.

3. The method of claim 1 wherein the acid solution is aqueous HCl.

4. The method of claim 3 wherein the concentration of the HCl in the acid solution is greater than 25 percent by weight of the acid solution phase of the emulsion.

5. The method of claim 4 wherein the amine is dodecylamine or cocoamine and the amide is the diethanolamide of oleic acid.

6. A method for stimulating the production of fluids from a subterranean formation, at least part of which is soluble in acid at the temperature of the formation, which comprises contacting said formation with a retarded acidizing emulsion comprising an aqueous acidizing solution dispersed in oil, said emulsion containing by weight of said emulsion, from about 0.01 to about 10 percent a primary $C_8$ to $C_{18}$ alkyl amine and from about 0.85 to about 2 parts of at least one diethanolamide of at least one $C_8$ to $C_{18}$ fatty acid, per part by weight of said primary amine.

7. The method of claim 6 wherein said amine comprises about 0.05–0.5 percent by weight of said emulsion.

8. The method of claim 7 wherein said amine is cocoamine or dodecylamine.

9. The method of claim 6 wherein from about 1 to about 1.6 parts by weight of said diethanolamide is employed per part by weight of said primary amine.

10. The method of claim 9 wherein the diethanolamide is the diethanolamide of at least one $C_{18}$ fatty acid.

11. The method of claim 10 wherein the primary amine is cocoamine or dodecylamine, and said amine comprises from about 0.05 to about 0.5 weight percent of said emulsion.

12. The method of claim 6 wherein the acidizing solution is an HCl solution.

13. The method of claim 12 wherein the acidizing solution is greater than 15 weight percent HCl.

14. The method of claim 13 wherein the acidizing solution is greater than 25 weight percent HCl.

15. The method of claim 6 wherein the emulsion comprises about 5 to about 95 percent by volume liquid hydrocarbon.

16. The method of claim 15 wherein the emulsion comprises about 10–50 volume percent liquid hydrocarbon.

17. The method of claim 16 wherein the emulsion comprises about 25–35 volume percent liquid hydrocarbon.

18. The method of claim 6 wherein the emulsion consists substantially of:
   about 25–35 volume percent kerosene;
   about 75–65 volume percent aqueous HCl having a concentration greater than 15 weight percent HCl;
   about 0.05–0.5 weight percent cocoamine or dodecylamine; and
   about 1–1.6 parts by weight of the diethanolamide of oleic acid per part of said amine.

19. The method of claim 18 wherein the concentration of HCl is greater than 25 weight percent.

20. The method of claim 18 wherein the temperature of the formation is about 150°–250° F.

21. The method of claim 6 wherein the temperature of the formation is at least about 150° F.

22. The method of claim 6 wherein the emulsion is injected into the formation at a rate and pressure sufficient to fracture said formation.

23. In a composition for acidizing a subterranean formation, said composition being of the aqueous acidizing solution-in-oil emulsion type containing an effective amount of an alkyl $C_8$ to $C_{18}$ primary amine to reduce the normal reaction rate of said emulsion, the improvement which comprises: in said emulsion, an effective amount of at least one diethanolamide of at least one $C_8$ to $C_{18}$ fatty acid so that said emulsion substantially completely breaks when the acidizing capacity of the emulsion becomes substantially spent as a result of reaction with such a formation.

24. The composition of claim 23 wherein the amine is dodecylamine or cocoamine and the amide is the diethanolamide of oleic acid.

25. The composition of claim 23 wherein the acid solution is aqueous HCl.

26. The composition of claim 25 wherein the concentration of the HCl in the acid solution is greater than 25 percent by weight of the acid solution phase of the emulsion.

27. The composition of claim 26 wherein the amine is dodecylamine or cocoamine and the amide is the diethanolamide of oleic acid.

28. A retarded acidizing emulsion suitable for use in methods for increasing the permeability of at least partially acid soluble subterranean formations, comprising: an aqueous acidizing solution dispersed in oil, said emulsion containing by weight of said emulsion, from about 0.01 to about 10 percent a primary $C_8$ to $C_{18}$ alkyl amine and from about 0.85 to about 2 parts of at least one diethanolamide of at least one $C_8$ to $C_{18}$ fatty acid, per part by weight of said primary amine.

29. The emulsion of claim 28 wherein said amine comprises about 0.05–0.5 percent by weight of said emulsion.

30. The emulsion of claim 29 wherein said amine is cocoamine or dodecylamine.

31. The emulsion of claim 28 wherein from about 1 to about 1.6 parts by weight of said diethanolamide is employed per part by weight of said primary amine.

32. The emulsion of claim 31 wherein the diethanolamide is the diethanolamide of at least one $C_{18}$ fatty acid.

33. The emulsion of claim 32 wherein the primary amine is cocoamine or dodecylamine, and said amine comprises from about 0.05 to about 0.5 weight percent of said emulsion.

34. The emulsion of claim 28 wherein the acidizing solution is an HCl solution.

35. The emulsion of claim 34 wherein the acidizing solution is greater than 15 weight percent HCl.

36. The emulsion of claim 35 wherein the acidizing solution is greater than 25 weight percent HCl.

37. The emulsion of claim 28 wherein the emulsion comprises about 5 to about 95 percent by volume liquid hydrocarbon.

38. The emulsion of claim 37 wherein the emulsion comprises about 10–50 volume percent liquid hydrocarbon.

39. The emulsion of claim 38 wherein the emulsion comprises about 25–35 volume percent liquid hydrocarbon.

40. The emulsion of claim 28 wherein the emulsion consists substantially of:
about 25–35 volume percent kerosene;
about 75–65 volume aqueous HCl having a concentration greater than 15 weight percent HCl;
about 0.05–0.5 weight percent cocoamine or dodecylamine; and
about 1–1.6 parts by weight of the diethanolamide of oleic acid per part of said amine.

41. The emulsion of claim 40 wherein the concentration of HCl is greater than 25 weight percent.